US006738558B2

(12) United States Patent
Ruehl et al.

(10) Patent No.: US 6,738,558 B2
(45) Date of Patent: May 18, 2004

(54) MICROSCOPE WITH A PROXIMITY SENSOR

(75) Inventors: Helmut Ruehl, Giessen (DE); Wolfgang Rentzsch, Wetzlar (DE)

(73) Assignee: Leica Microsystems Wetzlar GmbH, Wetzlar (DE)

(*) Notice: Subject to any disclaimer, the term of this patent is extended or adjusted under 35 U.S.C. 154(b) by 41 days.

(21) Appl. No.: 10/124,722

(22) Filed: Apr. 18, 2002

(65) Prior Publication Data

US 2002/0181095 A1 Dec. 5, 2002

Related U.S. Application Data

(63) Continuation-in-part of application No. 09/284,443, filed as application No. PCT/DE97/02218 on Sep. 26, 1997, now abandoned.

(30) Foreign Application Priority Data

Oct. 24, 1996 (DE) .......................................... 196 43 558

(51) Int. Cl.$^7$ .............................................. G02B 21/00
(52) U.S. Cl. ....................................... 385/381; 359/385
(58) Field of Search ................................. 359/368, 381, 359/385, 227, 363, 369

(56) References Cited

U.S. PATENT DOCUMENTS

| 4,207,501 A | | 6/1980 | Smallegan |
|---|---|---|---|
| 4,415,952 A | * | 11/1983 | Hattori et al. ............... 362/572 |
| 4,531,816 A | | 7/1985 | Baumgartel |
| 4,565,428 A | | 1/1986 | Arndt et al. |
| 4,714,823 A | | 12/1987 | Spruck et al. |
| 4,843,283 A | | 6/1989 | Chen |
| 4,912,388 A | | 3/1990 | Tanaka et al. |
| 4,989,253 A | | 1/1991 | Liang et al. |
| 5,000,555 A | | 3/1991 | Sato |
| 5,134,515 A | * | 7/1992 | Papritz et al. ............... 359/223 |
| 5,137,758 A | | 8/1992 | Kistner et al. |
| 5,239,171 A | | 8/1993 | Takabayashi et al. |
| 5,287,129 A | | 2/1994 | Sano et al. |
| 5,345,087 A | | 9/1994 | Luber et al. |
| 5,581,323 A | * | 12/1996 | Suzuki et al. ................. 396/51 |
| 5,661,598 A | | 8/1997 | Tomioka |
| 5,684,627 A | | 11/1997 | Ganser et al. |
| 5,861,982 A | * | 1/1999 | Takahama et al. .......... 359/381 |
| 5,861,985 A | | 1/1999 | Ikoh |

FOREIGN PATENT DOCUMENTS

| DE | 35 35 749 | 10/1986 |
|---|---|---|
| DE | 42 02 505 | 8/1993 |
| DE | 42 31 379 | 3/1994 |
| DE | 44 46 185 | 2/1996 |
| DE | 195 38 382 | 4/1996 |
| EP | 0 043 133 | 1/1982 |
| WO | 92/10074 | 6/1992 |
| WO | 94/07172 | 3/1994 |
| WO | 96/13743 | 5/1996 |
| WO | 98/18036 | 4/1998 |

* cited by examiner

Primary Examiner—Mark A. Robinson
Assistant Examiner—Alessandro Amari
(74) Attorney, Agent, or Firm—Foley & Lardner LLP

(57) ABSTRACT

A microscope with a viewing tube for visual observation of a specimen by an observer, with a control circuit for controlling electrical and/or electro-motor-driven microscope functions, and an illuminating device for illuminating the specimen to be observed is described. The control circuit is connected to a proximity sensor installed on the microscope, which responds to the presence of the observer to the viewing tube. The control circuit includes an adjustable time-delay logic element located in the control circuit for delaying switches of the microscope functions such that the microscope functions are switched after the observer is absent for a predetermined time period.

18 Claims, 1 Drawing Sheet

MICROSCOPE WITH A PROXIMITY SENSOR

CROSS REFERENCE TO RELATED APPLICATION

The present application is a continuation-in-part of U.S. application Ser. No. 09/284,443, filed on Apr. 14, 1999, now abandoned which corresponds to PCT Application No. PCT/DE97/02218, filed Sep. 26, 1997, which claims the benefit of German Application No. 196 43 558.7, filed on Oct. 24, 1996. U.S. application Ser. No. 09/284,443, PCT Application No. PCT/DE97/02218, and German Application No. 196 43 558.7 are each incorporated by reference herein, in their entirety.

BACKGROUND OF INVENTION

1. Field of the Invention

The invention relates to a microscope having a proximity sensor and a control circuit for automatically switching electrical microscope functions.

2. Description of Related Art

Modern microscopes are distinguished, inter alia, by the fact that the various microscope functions are designed in such a way that they can be controlled electrically and/or by electric motor. For example, known electrically operating switching and adjusting functions are autofocusing devices, motor-driven adjustments of the specimen stage, electrically switchable shutters, filters or phase-retarding rings etc. A microscope in which these functions are realized is described, for example, in DE 42 31 379 A1.

In this microscope, the operating elements for the switching functions are grouped together in an ergonomic way on a control console and have to be manually selected by the observer. This has proved successful in practice. However, due to the large number of electrically controllable microscope functions, the area around the microscope, and consequently also the specimen to be observed, is exposed to heat. In particular when using lighting devices with very high lamp outputs, such as for example gas-discharge lamps, the specimen may be damaged by the heat to which it is exposed. Particularly sensitive specimens are, for example, living cells or else specimens in fluorescence microscopy, which may be destroyed by high luminous intensities.

The observer is in these cases obliged to deactivate or switch the switchable function manually by means of the control console. It has been found in practice that, for many applications, this procedure is always inconvenient if, for example, the microscope function is not required for a short time.

In the case of photographic cameras, it is known to arrange on or in the viewfinder a sensor which activates or deactivates the entire main circuit of the camera according to whether or not the photographer is looking into the viewfinder. In the case of cameras, this is only with the intention of saving the battery.

In the case of microscopes it is also the case that the main circuit must not be interrupted, since this would necessitate complete re-setting of the microscope when the functions were activated once again. In addition, the lifetime of lamps is reduced considerably by frequent switching on and off.

WO 96/13743 A1 discloses a microscope with a sensor and a control device, in which the microscope functions can be controlled contactlessly by the position of the observer's pupil. A device for detecting the position of the pupil is equipped with a switching element, which interrupts the measuring routine as soon as the device for detecting the position of the pupil cannot perceive a pupil.

Furthermore, DE 44 46 185 A1 discloses a laser scanning microscope with a UV laser and with an optical fiber, in which the damage caused by UV light is reduced by providing between the laser and the optical fiber a scanning shutter, which exposes the optical fiber only during scanning.

BRIEF SUMMARY OF INVENTION

It is therefore an object of the present invention to develop a known microscope with simplest possible means in such a way that, independently of the manual operation by a person, the electrical and/or electric-motor-driven microscope functions can also be performed fully automatically, and at the same time damage to sensitive specimens or impairment of the image quality is reduced.

This object is achieved according to the invention by the features specified herein. According to an embodiment of the present invention, a microscope includes a viewing tube for the visual examination of a specimen and an illumination device for illuminating the specimen. The microscope comprises a control circuit housed in the microscope for activating electrical microscope functions and a proximity sensor connected to the control circuit and fitted on the microscope for responding to the absence of an observer viewing the specimen through the viewing tube. The control circuit includes an adjustable time-delay logic element located in the control circuit for delaying switches of the microscope functions such that the microscope functions are switched after the observer is absent for a predetermined time period. Further advantageous developments of the invention are also described.

The arrangement of a proximity sensor on or in the eyepiece and its connection to the control circuit make it possible for microscope functions to be controlled fully automatically. These functions are initiated whenever the user looks into the eyepiece on the tube, or if said user does not look in. This fully automatic control has proved successful in particular in fluorescence microscopy for swiveling an occulting shutter in and out of the illuminating beam. This avoids a gradual bleaching of the specimen (fading effect) being caused by unnecessary illumination.

The obscuring of the illuminating light by an occulting shutter or by regulating the lamp voltage is of course also advisable if living tissue or cells are to be observed and/or worked on using the microscope.

The proximity sensor is advantageously also used in the case of microphotographic exposures. In this case, to avoid the incidence of extraneous light through the eyepiece, an occulting shutter is swiveled into the observing beam. Of course, it is also possible to activate a beam-splitting mirror by means of the proximity sensor and the control circuit, so that all of the light coming from the specimen can be used for the photographic exposure.

Thus, according to an embodiment of the present invention, a microscope includes an observation beam path, an observation tube for an observation of a specimen, a control circuit for activating electrical microscope functions, and an illumination system for illuminating the specimen. The microscope further includes an eyepiece coupled to the observation tube for observing the specimen, a camera, a movable mirror positionable in the observation beam path, and a proximity sensor coupled to the observation tube and the control circuit. Upon the approach of an observer to the eyepiece, the proximity sensor emits a signal. A position of the movable mirror corresponds to the signal of the proximity sensor and the observation beam path propagates to one of the observation tube and the camera based on the position of the movable mirror.

A commercially available proximity sensor, forming a separate structural unit, may be used on the tube of the microscope. The proximity sensor may in this case be designed as a light sensor, such as for example as a reflection barrier, a forked light barrier, a passive infrared detector or an ultrasonic detector. A contact-sensitive switch may also be used as the proximity sensor.

According to another embodiment, a microscope includes an observation beam path, an observation tube for an observation of a specimen, a control circuit for activating electrical microscope functions, and an illumination system for illuminating the specimen. The microscope further includes an eyepiece coupled to the observation tube for observing the specimen, a camera coupled to a photo-tube, a movable mirror positionable in the observation beam path, and a proximity sensor coupled to the observation tube. Upon the approach of an observer to the eyepiece, the proximity sensor emits a signal. The control circuit is coupled to the movable mirror and changes a position of the movable mirror corresponding to the signal of the proximity sensor. The observation beam path propagates to one of the observation tube and the camera based on the position of the movable mirror. In addition, the microscope can include an actuator coupled to the moveable mirror and the control circuit to place the movable mirror in a first position which allows propagation of the observation beam path into the eyepiece and a second position which allows propagation of the observation beam path into the photo-tube. Preferably, the actuator is one of a motor and an electromagnet.

Also, according to this embodiment, the microscope can include an adjustable time-delay logic element coupled to the control circuit, responsive to the presence and absence of the signal from the proximity sensor, for delaying switches of the microscope functions such that the microscope functions are switched after the observer is absent for a first continuously adjustable time period to protect the specimen and to prevent frequent switching of the illumination device when the observer is momentarily absent from an observing position. Further, the control circuit can provide a trigger for a first change of the position of the movable mirror upon the presence of a continuous signal from the proximity sensor for a second continuously adjustable time period of about 1 second to about 1 minute.

Other advantages and novel features of the present invention will become apparent from the following detailed description of the invention when considered in conjunction with the accompanying drawing.

BRIEF DESCRIPTION OF DRAWINGS

The invention is explained in more detail on the basis of exemplary embodiments with the aid of schematic drawings, in which.

DETAILED DESCRIPTION OF THE PREFERRED EMBODIMENTS

Figure 1:
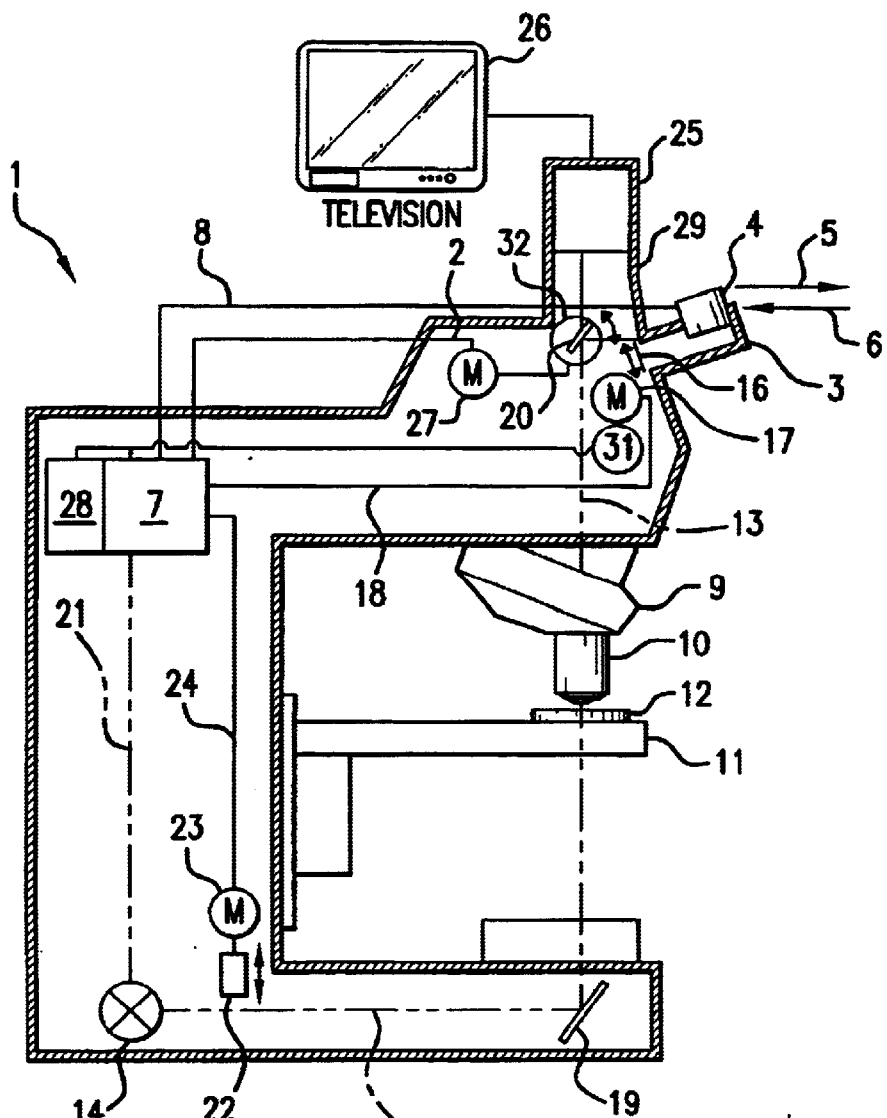
FIG. 1 shows a schematic diagram of the microscope according to an embodiment of the invention.

FIG. 1 shows a microscope 1 with a tube 2 and an eyepiece 3. The microscope 1 has, furthermore, an objective turret 9 with an objective 10 and a microscope stage 11 for the specimen 12 to be observed by means of an observing beam 13. The specimen 12 is illuminated by means of a light source 14, arranged in the microscope 1, the associated illuminating beam 15 and the deflecting mirror 19. The light source 14 is electrically connected to a control device or circuit 7 by a line 21.

Arranged on the eyepiece 3 is a proximity sensor 4, which emits IR rays 5 and receives again reflected IR rays 6. Arranged in the microscope 1 is the control circuit 7, which is connected to the proximity sensor 4 by an electrical line 8.

An optical element 20 is provided in the observing beam 13 for deflecting the light coming from the specimen 12 into the eyepiece 3. Optical element 20 is preferably a reflecting element that is rotatable and/or laterally displaceable in the observing beam 13. Optical element 20 can be, e.g., a prism, a switchable prism, a mirror, preferably highly reflective, or other reflective optical element, as discussed below. To avoid the incidence of extraneous light through the eyepiece 3, also arranged in the observing beam 13 is an eyepiece shutter 16, which is designed in such a way that it can be moved by a motor 17. The motor 17 is connected to the control circuit 7 by the control line 18.

A switchable occulting shutter 22, which is designed in such a way that it can be moved in the direction of the double-headed arrow by means of a motor 23, is provided in the illuminating beam 15 for obscuring the illuminating light coming from the light source 14. The motor 23 is connected to the control circuit 7 by an electrical line 24.

The proximity sensor 4 constantly emits IR rays 5. These rays 5 are reflected from an observer (not included in the representation) when said observer looks into the eyepiece 3. The reflected rays 6 are received again by the proximity sensor 4, the sensitivity of the sensor input to the reflected IR rays being of a preselectable design. The reception of IR rays 6 causes a corresponding signal to be emitted by the proximity sensor 4 via the control line 8 and to be registered in the control circuit 7. In this case, corresponding signals are emitted from the control circuit 7 via the two lines 18 and 24 to the two servo motors 17 and 23. The eyepiece shutter 16 is then swiveled out of the observing beam 13 by means of the motor 17.

In analogy with this, the occulting shutter 22 is also brought out of the illuminating beam 15 by means of the motor 23.

If no IR rays 6 reflected from the observer are received by the proximity sensor 4, a corresponding signal is triggered by means of the control circuit 7 and both the occulting shutter 22 and the eyepiece shutter 16 are brought back into the respective beam.

If incandescent or halogen lamps are used in the microscope 1, they can be supplied with current by means of the electrical line 21, so that a dimming of the light source 14 is possible with the control circuit 7. If no reflected IR rays 6 are received by the proximity sensor 4, the light source 14 is dimmed. If IR rays are received, the lamp 14 can be operated again at the operating voltage or operating current.

In the exemplary embodiment described, the "transmitted light" operating mode for the illuminating device is represented and described. It goes without saying that it is within the scope of the invention to use the proximity sensor in microscopes with a different type of illumination, such as for example reflected-light illumination or a combined reflected light/transmitted light illumination.

To avoid unnecessary frequent switching in the absence of the received IR signal, an adjustable time-delay logic 28 is provided in the control circuit. This achieves the effect that the switching pulses emitted to the two motors 17 and 23 are only emitted after an adjustable time period has expired. As mentioned above, the adjustable time period can be greater than a time that the observer momentarily is absent from the eyepiece (to prevent unnecessary switching on-and-off of the illumination source), and less than a time that corresponds to an amount of time where lengthy illumination of the sample may cause sample damage. For example, this time period can be from about 1–5 seconds to about 1 minute, depending on the sample being observed. If the particular sample is not as susceptible to damage via prolonged exposure, then the time period delaying the switching off of microscope functions can be set at a longer time. The adjustable time period can be preset by the user (before observation) using a time dial and/or a digital time interface 31 mounted on the microscope and coupled to the adjustable time delay logic element 28 and/or the control circuit 7.

It is of course within the scope of the invention for other microscope functions, such as for example an autofocusing device, a photographic device or electric consumers in general, to be switched by means of the proximity sensor and the control circuit.

Accordingly, as mentioned above, an optical element 20, such as a reflector (e.g., a mirror, prism, or switchable prism), can be utilized to alternate viewing between the eyepiece 3 and a camera 25. For example, in the observation beam path 13 of the microscope 1, a mirror 20 is disposed which is made so as to be moveable and/or displaceable by an actuator 27, such as a conventional motor (e.g., a stepper motor) or an electromagnet. In the embodiment shown in FIG. 1, the mirror 20 can then deflect the light of the observation beam path coming from the specimen 12, into the eyepiece 3 in one step position and, in another (step) position, the observation beam path propagates along the dotted line of FIG. 1 into the photo-tube 29. The mirror 20 can be mounted on a base or carrier 32 that is laterally or rotatably displaceable to move the mirror 20 in or out of observation beam path 13.

Camera 25 can be a video camera or a conventional photographic camera that is mounted to the photo-tube 29, or another type of camera. If a video camera is used, the camera 25 can be further coupled to a monitor 26 for observation of the camera image.

Further, the signal emitted from proximity sensor 4 can be used as a basis for switching the position of the movable mirror 20. For example, when an observer approaches the eyepiece 3, the sensor 4 gives an "approach" signal to the control circuit 7. The control circuit 7 is then activated and picks up a second continuously adjustable time period set through the adjustable time delay logic 28. For example, this continuously adjustable time period can be selected via an interface on the microscope housing (similar to dial/interface 31) from about 1 second to about 1 minute. Preferably, this adjustable time period is set at about 3 seconds. In an example operation, when the sensor 4 continuously supplies the "approach" signal for at least 3 seconds, the movable mirror can be switched into the first position, thus allowing observation of the image through the eyepiece 3. If the "approach" signal from the proximity sensor 4 is not continuous for the selected (e.g., 3 seconds) time period, the movable mirror is not switched. Thus, not until after 3 seconds and the continuous presence of the signal during this period of time does the motor become activated by the control circuit 7 and the mirror 20 is brought to the first position, allowing the observation beam path 13 to be deflected into the eyepiece 3.

In this example operation, if the observer is no longer looking into the eyepiece 3, the sensor 4 stops giving a signal. In a manner similar to that already described, in the case of the "approach" signal, after 3 seconds of a continuous absence of the signal from sensor 4, the mirror 20 is changed back to the second position, and the image can again be observed by the camera 25 and/or the monitor 26. The time period corresponding to a continuous presence of the observer at the eyepiece (before triggering a change in position of the mirror to allow eyepiece viewing) and the time period corresponding to a continuous absence of the observer (for the purpose of switching the mirror position to provide camera observation) can be the same or a different amount of time.

Figure 2:
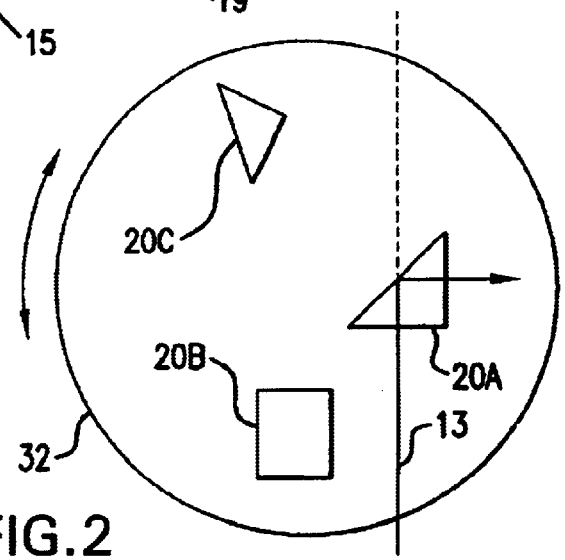
FIG. 2 shows an example carrier plate that includes three prisms to switch viewing in accordance with an alternative embodiment of the present invention.

Alternatively, variations of the above device include: the photo-tube 29 being disposed in another region of the microscope, such that when the mirror 20 is in a first position, it deflects the observation beam path 13 into the eyepiece 3, and when mirror 20 is in a second position (e.g., rotated to a different angle), it deflects observation beam path 13 into the photo-tube 29. In another alternative embodiment, when the mirror 20 is in a first position, the observation beam path 13 is deflected to the photo-tube 29, and when mirror 20 is in a second position, observation beam path 13 passes to the eyepiece 3 (here, the eyepiece 3 and the photo-tube 29 can be switched in position than as that shown in FIG. 1). In a further alternative embodiment, the mirror 20 is a prism that is displaceable in or out of observation beam path 13. In yet another alternative embodiment, a prism 20 remains fixed in position, and an additional mirror (not shown) is positionally displaceable in the observation beam path 13 at a location along observation beam path 13 between prism 20 and turret 9, such that in a first position, observation beam path 13 passes to the eyepiece 3, and in a second position, the additional mirror deflects observation beam path 13 towards the photo-tube 29. In yet another alternative embodiment, two or more prisms mounted on a carrier or base 32 can be utilized. The carrier 32 is coupled with the motor 27 to bring one of the prisms into a desired position (corresponding to the desired viewing position selected). For example, as illustrated in FIG. 2, a first prism 20A (in a first position) can be used to deflect the observation beam 13 into the eyepiece, a second prism 20B (in a second position, and oriented to deflect the beam at an angle out of the plane of the drawing) can be used to "deflect" the observation beam 13 to the video camera, and a third prism 20C (in a third position) can be used to deflect the observation beam 13 to, e.g., a second camera, a second eyepiece, a photographic camera, or a photosensitive detector.

The ability to delay the changeover from video/photographic observation to eyepiece observation is especially preferred when microscope 1 is configured as a fluorescence microscope. Such changing-over is preferred when very little light is available, as is the case with some types of fluorescent illumination because simultaneously splitting the light to an eyepiece and the camera may result in insufficient light propagating to the eyepiece and/or the camera. In addition, it is preferred that element 20 is a highly reflective mirror or prism, e.g., a metal-coated mirror (having about 85% or greater reflectivity) because partially reflective mirrors do not provide enough image light for a more resolved image when very little light may be available. The ability to observe the sample with the eyepiece when desired is preferred because the eyepiece may provide the maximum resolution of the image, whereas photographic cameras or video cameras may not provide this maximum resolution.

| List of Parts by Reference Number |
| --- |
| 1. microscope |
| 2. tube |
| 3. eyepiece |
| 4. proximity sensor |
| 5. emitted IR rays |
| 6. reflected IR rays |
| 7. control device |
| 8. electrical line 4–7 |
| 9. objective turret |
| 10. objective |
| 11. microscope stage |
| 12. specimen |
| 13. observing beam |
| 14. light source |
| 15. illuminating beam |
| 16. eyepiece shutter |
| 17. motor |
| 18. control line 7–17 |
| 19. deflecting mirror |
| 20. optical element, reflector |
| 21. electrical line 7–14 |
| 22. occulting shutter |
| 23. motor |
| 24. electrical line 7–23 |
| 25. camera |
| 26. television |
| 27. actuator (motor or electromagnet) |
| 28. adjustable time relay logic |
| 29. photo-tube |
| 31. time delay interface |
| 32. carrier |

We claim:

1. A microscope, comprising:

an observation beam path;

an observation tube for an observation of a specimen;

a control circuit for activating electrical microscope functions;

an illumination system for illuminating the specimen;

an eyepiece coupled to the observation tube for observing the specimen;

a camera coupled to a photo-tube;

a movable reflector positionable in the observation beam path;

a proximity sensor coupled to the observation tube and the control circuit, wherein upon the approach of an observer to the eyepiece, the proximity sensor emits a signal, wherein the control circuit is coupled to the movable reflector and changes a position of the movable reflector based on the signal of the proximity sensor, and wherein the observation beam path propagates to one of the observation tube and the camera based on the position of the movable reflector;

an actuator coupled to the moveable reflector and the control circuit to place the movable reflector in a first position which allows propagation of the observation beam path into the eyepiece and a second position which allows propagation of the observation beam path into the photo-tube; and an adjustable time-delay logic element coupled to the control circuit, responsive to the presence and absence of the signal from the proximity sensor, wherein the control circuit triggers a first change of the position of the movable reflector upon the presence of a continuous signal from the proximity sensor for a first continuously adjustable time period of about 1 second to about 1 minute, to move the movable reflector into the first position; wherein the adjustable time-delay logic element delays a switching off of the microscope functions such that the microscope functions are switched off after the observer is absent for a second continuously adjustable time period to protect the specimen being observed and to prevent frequent switching of the illumination system when the observer is momentarily absent from an observing position.

2. The microscope according to claim 1, wherein the actuator is one of a motor and an electromagnet.

3. The microscope according to claim 1, wherein the first continuously adjustable time period is set in the adjustable time-delay logic element via an interface mounted on the microscope.

4. The microscope according to claim 1, wherein the control circuit switches off the illumination system after the observer is absent for the second continuously adjustable time period.

5. The microscope according to claim 4, wherein the control circuit controls an output illumination intensity of the illumination system after the observer is absent from the eyepiece for the second continuously adjustable time period.

6. The microscope according to claim 1, further comprising:

a moveable occulting shutter coupled to the control circuit and placeable in the illuminating beam path for obscuring illuminating light emanating from the illumination system when the observer is absent from the eyepiece for the second continuously adjustable time period.

7. The microscope according to claim 1, further comprising:

a moveable eyepiece shutter placeable in the observation tube for avoiding an incidence of extraneous light through the eyepiece when the observer is absent for the second continuously adjustable time period.

8. The microscope according to claim 1, wherein the proximity sensor comprises one of an infrared detector, an ultrasonic detector, and a contact sensitive switch.

9. The microscope according to claim 1, wherein the microscope is a fluorescence microscope and the proximity sensor controls specimen illumination provided by the illumination system.

10. A microscope, comprising:

an observation beam path;

an observation tube for an observation of a specimen;

a control circuit for activating electrical microscope functions;

an illumination system for illuminating the specimen;

an eyepiece coupled to the observation tube for observing the specimen;

a camera coupled to a photo-tube;

a movable reflector positionable in the observation beam path;

a proximity sensor coupled to the observation tube and the control circuit, wherein, upon the approach of an observer to the eyepiece, the proximity sensor emits a signal, wherein the control circuit is coupled to the movable reflector and changes a position of the movable reflector based on the signal of the proximity sensor, and wherein the observation beam path propagates to one of the observation tube and the camera based on the position of the movable reflector;

an actuator coupled to the moveable reflector and the control circuit to place the movable reflector in a first position which allows propagation of the observation beam path into the eyepiece and a second position which allows propagation of the observation beam path into the photo-tube; and an adjustable time-delay logic element coupled to the control circuit, responsive to the presence and absence of the signal from the proximity sensor, wherein the control circuit triggers a first change of the position of the movable reflector upon the presence of a continuous signal from the proximity sensor for a first continuously adjustable time period of about 1 second to about 1 minute, to move the movable reflector into the first position; wherein after a continuous absence of the signal from the proximity sensor for a second continuously adjustable time period of about 1 second to about 1 minute, the control circuit triggers a second change of the position of the movable reflector, to move the movable reflector into the second position.

11. The microscope according to claim 10, wherein the control circuit switches off the illumination system after the observer is absent for the second continuously adjustable time period.

12. The microscope according to claim 11, wherein the control circuit controls an output illumination intensity of the illumination system after the observer is absent from the eyepiece for the second continuously adjustable time period.

13. The microscope according to claim 10, further comprising:

a moveable occulting shutter coupled to the control circuit and placeable in the illuminating beam path for obscuring illuminating light emanating from the illumination system when the observer is absent from the eyepiece for the second continuously adjustable time period.

14. The microscope according to claim 10, further comprising:

a moveable eyepiece shutter placeable in the observation tube for avoiding an incidence of extraneous light through the eyepiece when the observer is absent for the second continuously adjustable time period.

15. The microscope according to claim 10, wherein the proximity sensor comprises one of an infrared detector, an ultrasonic detector, and a contact sensitive switch.

16. The microscope according to claim 10, wherein the microscope is a fluorescence microscope and the proximity sensor controls specimen illumination provided by the illumination system.

17. The microscope according to claim 10, wherein the actuator is one of a motor and an electromagnet.

18. The microscope according to claim 10, wherein the first continuously adjustable time period is set in the adjustable time-delay logic element via an interface mounted on the microscope.

* * * * *